US006691950B2

(12) United States Patent
Salesse-Lavergne

(10) Patent No.: US 6,691,950 B2
(45) Date of Patent: Feb. 17, 2004

(54) DEVICE AND SYSTEM FOR THE AUTOMATIC CONTROL OF A HELICOPTER

(75) Inventor: Marc Salesse-Lavergne, Marseilles (FR)

(73) Assignee: Eurocopter, Marignane (FR)

(*) Notice: Subject to any disclaimer, the term of this patent is extended or adjusted under 35 U.S.C. 154(b) by 0 days.

(21) Appl. No.: 10/256,072

(22) Filed: Sep. 27, 2002

(65) Prior Publication Data

US 2003/0066926 A1 Apr. 10, 2003

(30) Foreign Application Priority Data

Oct. 5, 2001 (FR) .............................................. 01 12828

(51) Int. Cl.$^7$ .............................................. B64C 27/57
(52) U.S. Cl. ........................... 244/17.13; 701/7; 416/40
(58) Field of Search .............................. 244/17.13, 194, 244/195; 701/3, 7; 416/31, 40, 44

(56) References Cited

U.S. PATENT DOCUMENTS

| 4,129,275 A | 12/1978 | Gerstine et al. |
|---|---|---|
| 4,628,455 A | 12/1986 | Skutecki |
| 5,738,300 A | 4/1998 | Durand |

Primary Examiner—Galen L. Barefoot
(74) Attorney, Agent, or Firm—Stevens, Davis, Miller & Mosher, LLP

(57) ABSTRACT

Device and system for the automatic control of a helicopter.

The automatic control device (6) comprises a vertical objective law (A) in respect of the pitching axis, which automatically determines a control command (UT1) for operating the tilting of the disk of main rotor of the helicopter, a speed limitation law (B) for limiting the airspeed of the helicopter with respect to at least one limit value, detection means (10) for automatically detecting whether the airspeed reaches the limit value, and toggling means (11) for, in order to select the objective law (A, B) whose control command (UT1, UT2) is used for the pitching axis, automatically toggling from the first law (A) to the second law (B), when the detection means (10) detect that the airspeed has reached the limit value.

7 Claims, 3 Drawing Sheets

DEVICE AND SYSTEM FOR THE AUTOMATIC CONTROL OF A HELICOPTER

BACKGROUND OF THE INVENTION

The present invention relates to an automatic control device for a helicopter, as well as to an automatic control system comprising such an automatic control device.

DESCRIPTION OF THE PRIOR ART

It is known that an automatic control system for a helicopter generally comprises:

- a set of sensors for automatically determining the effective values of state parameters of the helicopter;
- means of adjustment allowing an operator of the helicopter to choose preset values of state parameters;
- a set of actuators which act on control axes of the helicopter, according to control commands; and
- an automatic control device which automatically determines control commands for said actuators, as a function of the state parameters and of the preset values, received respectively from said sensors and from said means of adjustment.

The job of the automatic control system is to aid, or even to completely replace, the pilot in the flying of the helicopter. For this purpose, it is capable of slaving one or more state parameters of the helicopter, such as the altitude, the attitude or the speed for example, to one or more preset values chosen beforehand by the pilot.

To do this, said automatic control device acts in a known manner:

- on the cyclic axes (pitching axis, roll axis) and in general on the yaw axis. This case is referred to as "three-axis" automatic control; and
- optionally, also on the collective axis. This is referred to as "four-axis" automatic control.

It is known that the two cyclic pitch channels (pitching axis, roll axis) produce a cyclic variation of the angle of incidence of the blades, the blades then having angles of incidence which vary as a function of their azimuth. This results in a tilting of the main forward motion and lift rotor of the helicopter, forward (pitching) or to the side (roll), or a combination of both these movements.

In the "three-axis" configuration (pitch, roll, yaw) a mode with longitudinal-speed objectives and a mode with vertical objectives cannot be engaged simultaneously, since they are both based on pitchwise control, which can operate only one parameter at a time. Specifically, it is the pitching axis which, by operating the forward tilting of the rotor disk, makes it possible to control:

- either a horizontal objective (airspeed for example), by virtue of the horizontal component of the aerodynamic resultant of the rotor disk (of the main forward motion and lift rotor of the helicopter);
- or a vertical objective (vertical speed for example), by virtue of the vertical component of the aerodynamic resultant of said rotor disk.

In both cases, the power required for flight is, for its part, governed manually by the pilot by means of the collective axis. In a standard "three-axis" automatic control device, a vertical mode of which is controlled pitchwise, it is therefore the pilot of the helicopter who must personally manage the power required for flight. Now, imperfect management may lead in this case:

- to insufficient power, this culminating in a dangerous decrease in the airspeed (since the power is used first and foremost to maintain the preset of the vertical mode) which may become incompatible with the continuation of the flight; and
- to excessive power, which culminates in an increase in the airspeed, which may even exceed the maximum permitted speed and thus cause damage to the helicopter.

SUMMARY OF THE INVENTION

The object of the present invention is to remedy these drawbacks. It relates to an automatic control device exhibiting increased safety in a totally automatic mode, with no intervention from a pilot, by maintaining the helicopter in an ever-safe flight envelope.

For this purpose, according to the invention, said automatic control device comprising at least one first objective law which corresponds to a vertical objective law in respect of the pitching axis, such an objective law being to bring at least one state parameter of the helicopter to an objective which represents a preset value of a state parameter, said objective law in respect of the pitching axis automatically determining for this purpose a control command for operating the tilting of the disk of said main rotor of the helicopter, is noteworthy in that it moreover comprises, in respect of the pitching axis:

- at least one second objective law which corresponds to a speed limitation law which is intended for limiting the airspeed of the helicopter with respect to at least one limit value;
- detection means for automatically detecting the reaching by the airspeed of said limit value; and
- toggling means for, in order to select the objective law whose control command is used for the pitching axis, automatically toggling from said first law to said second law, when said detection means detect that the airspeed has reached said limit value.

Thus, by virtue of the invention, when a limit airspeed value is reached, said second law which is intended for limiting the airspeed is automatically engaged, this making it possible to remain under automatic control (without human intervention) and hence to remedy the aforesaid drawbacks, while maintaining the airspeed of the helicopter within a permitted domain of speeds. Of course, when the airspeed again deviates from the limit value, one returns automatically to the initial situation (consideration of the vertical objective law).

It will be noted that, within the framework of the present invention, an objective law is a means of calculation which determines a particular control command making it possible to bring or to bring back at least one state parameter of the helicopter to an objective (which represents a preset value of this state parameter or of another state parameter). Moreover, an objective law in respect of the pitching axis determines, automatically, for this purpose, a control command for operating the tilting of the disk of the main rotor of the helicopter.

Within the framework of the present invention said limit value of the airspeed may be:

- either a maximum permitted airspeed;
- or a minimum permitted airspeed.

However, in a preferred embodiment said detection means compare the airspeed (preferably directly) with respect to two limit values (upper and lower), namely the maximum permitted airspeed and the minimum permitted airspeed, and said second law is a law of protection of the airspeed envelope, which therefore protects both against low speeds and against high speeds.

The aforesaid characteristics of the invention relate to the case where the control of the collective axis is not accessible to the automatic control device ("three-axis" automatic control).

In the case where the control of the collective axis is also accessible to the automatic control device ("four-axis" automatic control), said automatic control device moreover comprises, according to the invention:

- at least one objective law which corresponds to a vertical objective law in respect of the collective axis, this vertical objective law automatically determining a control command for operating the collective pitch of the blades of said main rotor of the helicopter; and
- selection means which automatically select said vertical objective law, so as to use the corresponding control command in respect of the collective axis, when said detection means detect that the airspeed has reached said limit value.

Thus, by virtue of the invention, the vertical objective is achieved automatically by way of the collective axis (in this configuration), when the speed limitation law is active on the pitching axis.

Furthermore, in a particular embodiment, said automatic control device moreover comprises a holding-level law, detection means for automatically detecting leveling-off conditions and selection means for automatically selecting said holding-level law when said detection means detect leveling-off conditions, and doing so regardless of the objective law which is initially selected.

The present invention also relates to a system for the automatic control of a helicopter, of the type described above.

According to the invention, this automatic control system is noteworthy in that it comprises the aforesaid automatic control device.

BRIEF DESCRIPTION OF THE DRAWINGS

The figures of the appended drawing will elucidate the manner in which the invention may be embodied. In these figures, identical references designate similar elements.

DESCRIPTION OF THE PREFERRED EMBODIMENTS

Figure 1:
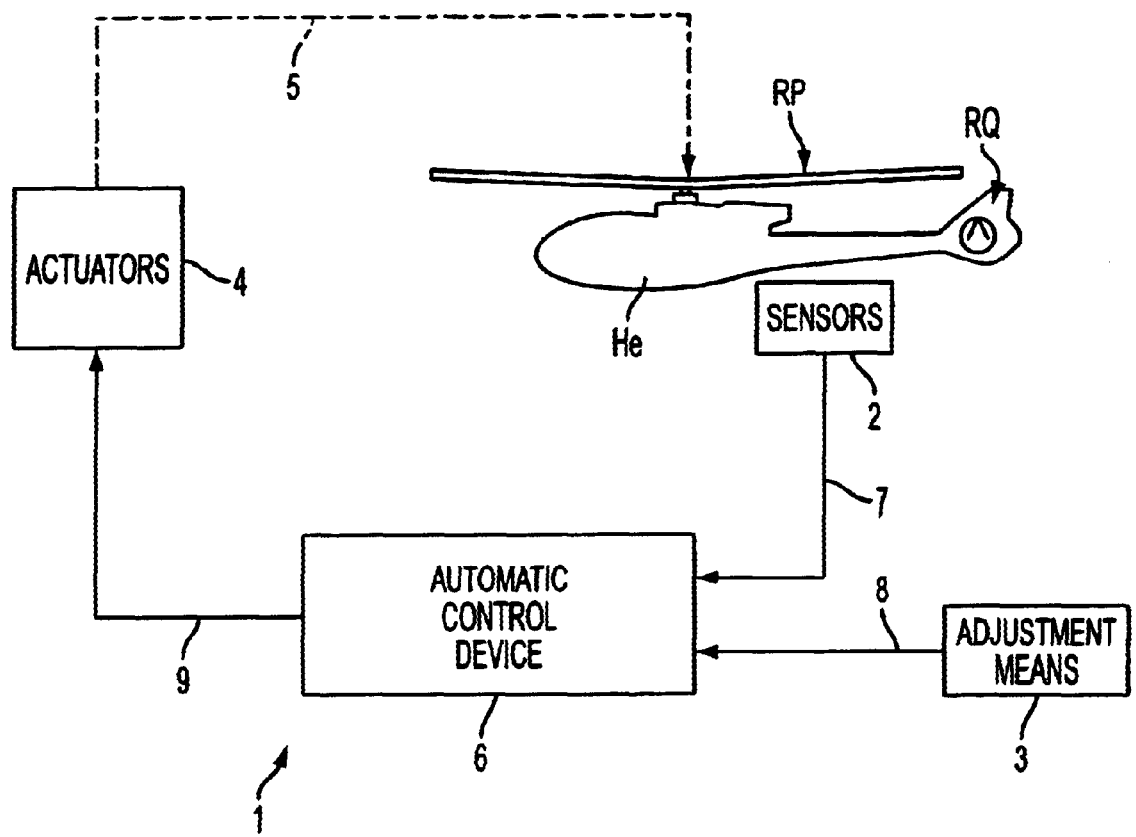
FIG. 1 is the schematic diagram of an automatic control system in accordance with the invention.

The automatic control system 1 in accordance with the invention and represented diagrammatically in FIG. 1 is mounted on board a helicopter He to be automatically controlled, although for reasons of clarity of the drawing, the helicopter He is represented on a small scale, outside said automatic control system 1, in this FIG. 1. In the example represented, the helicopter He comprises a main rotor RP intended for ensuring lift and forward motion, as well as a tail rotor RQ, intended for ensuring balance and yaw-wise control of the helicopter He.

Said automatic control system 1 comprises, in standard fashion:

- a set of standard sensors 2, for automatically determining (in particular measuring) the effective values of state parameters, such as the altitude, the height, the vertical speed, the attitude, the acceleration, the angular speed, the ground speed or the airspeed of the helicopter He, for example;
- standard means of adjustment 3, allowing an operator of the helicopter, in particular a pilot, to choose preset values of state parameters, such as the altitude, the height, the vertical speed, the distance, the airspeed or the acceleration of the helicopter He in particular;
- a set of standard actuators 4, which act on control axes of the helicopter He, as illustrated by a broken line 5, according to control commands; and
- an automatic control device 6 which automatically determines control commands for said actuators 4, as a function of the state parameters and of the preset values received respectively from said set of sensors 2 and from said means of adjustment 3, by way of links 7 and 8, and which automatically transmits (link 9) these control commands to said actuators 4, by way of an adaptation stage (not represented), the aim of which is to shape the control signals intended for the actuators 4 and to ensure the short-term stability of the helicopter He.

According to the invention, said automatic control device 6 acts at least on the cyclic axes (pitching axis and roll axis) and on the yawing axis of the helicopter He. This is why this is referred to as "three-axis" automatic control. However, only the pitching axis is considered within the framework of the present invention, for this "three-axis" configuration.

Figure 2:
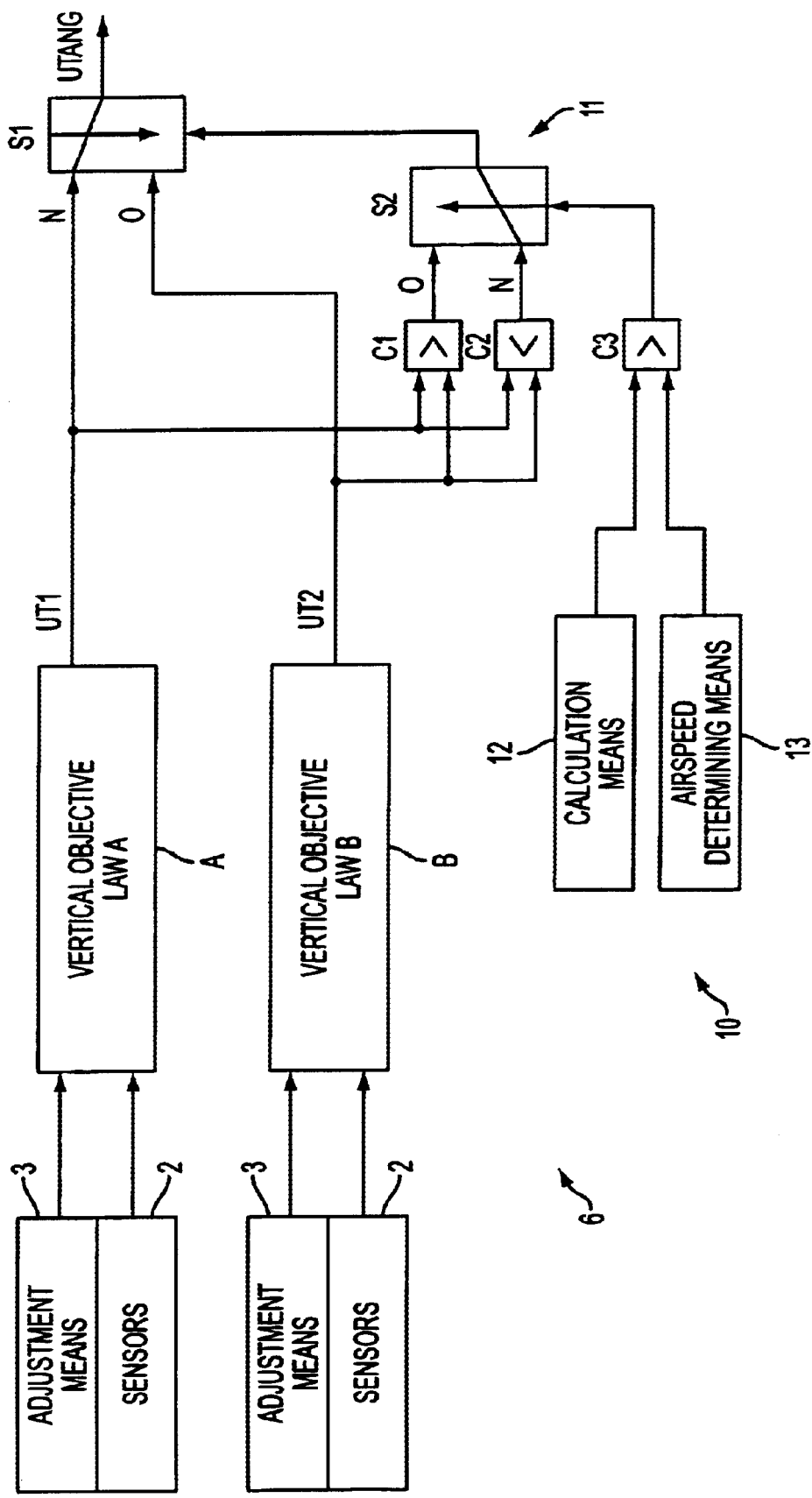
FIG. 2 is the schematic diagram of a basic embodiment of an automatic control device in accordance with the invention.

Said automatic control device 6 comprises, as represented in FIG. 2, at least one first objective law which corresponds to a vertical objective law A, in respect of the pitching axis.

It is known that such an objective law is a means of calculation, the aim of which is to bring at least one state parameter of the helicopter He to an objective which represents a preset value of a (the same or another) state parameter. For this purpose, said objective law determines, automatically, a control command UTANG for operating the tilting of the disk of said main rotor RP of the helicopter He.

In a known manner, such a vertical objective law A preferably uses:

- as state parameters measured by the set of sensors 2: the altitude, the height, the vertical speed, the vertical acceleration, the attitude and/or the angular speed; and
- as preset values which are fixed by the pilot by way of the means of adjustment 3: the altitude, the height, the vertical speed and/or the vertical acceleration for example.

On the basis of this information, this law A determines in a known manner, a control command UT1 making it possible to achieve a predetermined vertical objective such as the acquiring and maintaining of a barometric altitude, of a vertical speed, of an approach slope or of a "radio probe" height for example.

According to the invention, said automatic control device 6, in accordance with the invention, moreover comprises:

- at least one second objective law B which corresponds to a speed limitation law B which is intended for limiting the airspeed of the helicopter He with respect to at least one limit value. In the example represented in FIG. 2, this law B is an airspeed envelope protection law which is intended for limiting the airspeed of the helicopter He with respect to two limit values (upper and lower), namely the maximum permitted airspeed and the minimum permitted airspeed. To do this, this law B determines a control command UT2 on the basis of state parameters (airspeed, acceleration, attitude, angular speeds) received from the set of sensors 2 and of preset values (optimal upward speed, minimum permitted speed, zero acceleration) received from the means of adjustment 3;

detection means 10 for automatically detecting the reaching or even the exceeding of one of said limit values by the airspeed; and toggling means 11 for, in order to select the objective law A, B whose control command UT1, UT2 must be used for the pitching axis, automatically toggling from said first law A to said second law B, when said detection means 10 detect that the airspeed has reached (or exceeded) one of its limit values, and vice versa.

Thus, by virtue of the invention, when a limit value of the airspeed (that is to say of the speed of the helicopter He with respect to the air) is reached, the airspeed envelope protection law B is automatically tripped so as to control the pitching axis in such a way as to obtain efficient protection against the exceeding of the permitted range of speeds.

According to the invention, said detection means 10 comprise, in a preferred embodiment:

a means of calculation 12 for calculating the mean between the maximum permitted speed and the minimum permitted speed;

a means 13 for determining the effective airspeed of the helicopter He; and a comparator C3 which compares, with one another, the values received from said means 12 and 13. This comparator C3 therefore compares (indirectly) the airspeed with respect to said minimum and maximum permitted speeds.

Additionally, said toggling means 11 comprise:

a comparator C1 which compares the value UT1 formulated by the law A with the value UT2 formulated by the law B;

a comparator C2 which likewise compares the value UT1 of the law A with the value UT2 of the law B;

a selector S2 which receives at its inputs the information available at the outputs of the comparators C1 and C2 and which is controlled by the comparator C3; and a selector S1 which receives at its inputs the commands UT1 and UT2 and which is controlled by the selector S2.

It will be noted that, within the framework of the present invention, a comparator such as C1 and C3 which comprise the ">" sign, signifies that, if a value $\alpha$ is brought to the upper input and a value $\beta$ is brought to the lower input, the output takes the response:

O (yes), if $\alpha > \beta$; and

N (no), if $\alpha \leq \beta$.

On the other hand, a comparator such as the comparator C2, which comprises a "<" sign, signifies that, if a value $\gamma$ is brought to the upper input and a value $\delta$ is brought to the lower input, the output takes the response:

O (yes), if $\gamma < \delta$; and

N (no), if $\gamma \geq \delta$.

Figure 3:
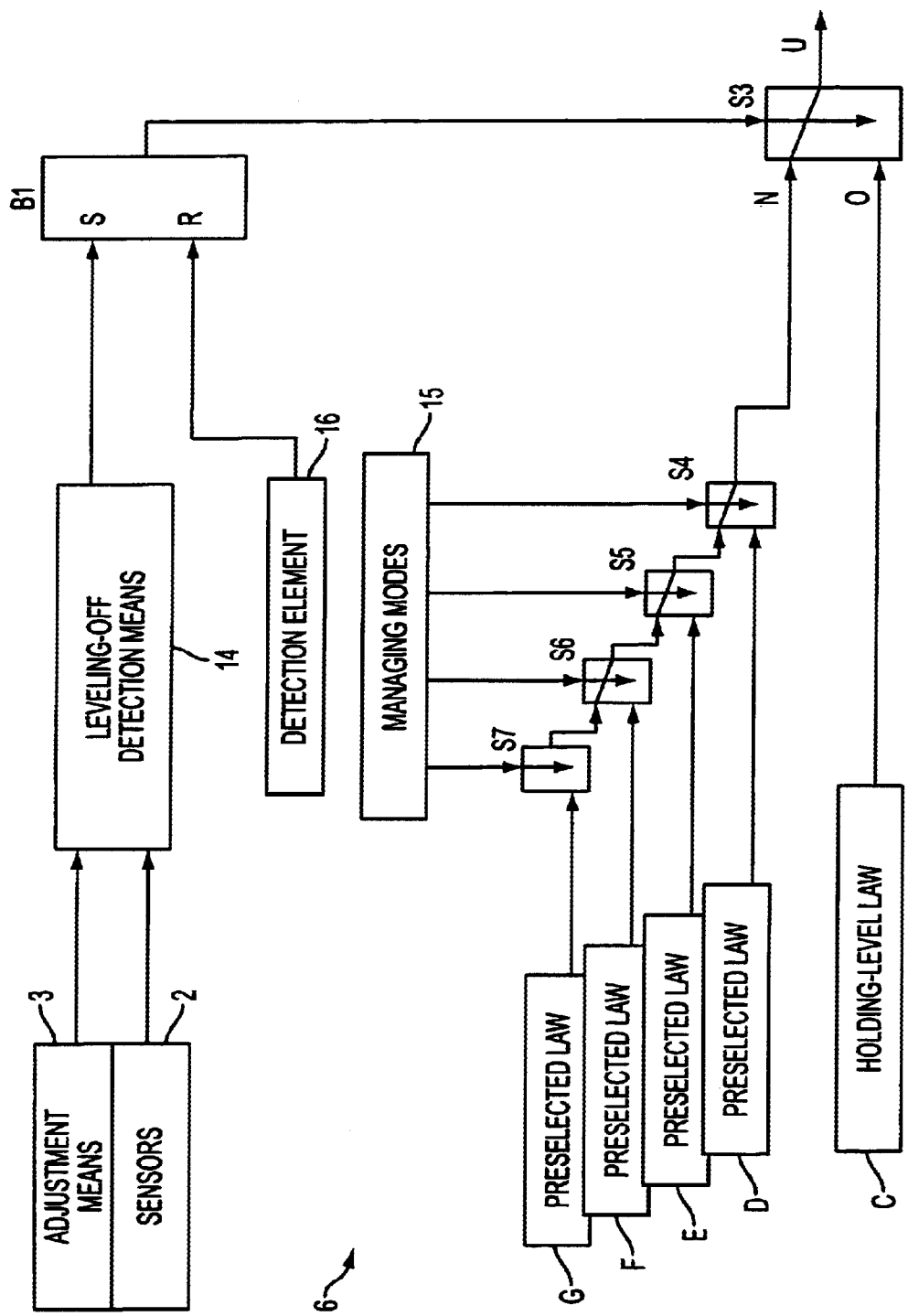
FIG. 3 diagrammatically shows an advantageous feature of the device in accordance with the present invention.

The letters O and N in FIGS. 2 to 3 correspond to these situations (yes and no).

Furthermore, within the framework of the present invention, any selector such as the selectors S1, S2 and S3 for example, links its output to one of the inputs O (yes) or N (no), as a function of the control thereof.

The aforesaid characteristics of the invention relate to the case where the control of the collective axis is not accessible to the automatic control device 6 ("three-axis" automatic control).

In the case where the control of the collective axis is also accessible to said automatic control device ("four-axis" automatic control), said automatic control device 6 moreover comprises, in a particular embodiment (not represented):

at least one objective law which corresponds to a vertical objective law in respect of the collective axis, this vertical objective law automatically determining a control command for operating the collective pitch of the blades of said main rotor RP; and selection means which automatically select said vertical objective law, so as to use the corresponding control command in respect of the collective axis, when said detection means 10 detect that the airspeed has reached one of said limit values.

Thus, in this particular embodiment, the vertical objective is achieved automatically by way of the collective axis, whereas the airspeed is held on its limit by a pitchwise airspeed objective law. No intervention from the pilot is therefore required for this.

Additionally, in a particular embodiment represented in FIG. 3, the automatic control device 6 in accordance with the invention comprises means 14 for detecting leveling-off conditions. The means 14 have the function of comparing vertical state parameters, such as the altitude, the height, the vertical speed and the vertical acceleration, with preset values corresponding to leveling-off, so as to detect the point of the trajectory of the helicopter He from which the leveling-off must be engaged automatically. This point of the trajectory may correspond to an altitude threshold, to a point of tangency between the trajectory followed and the programmed leveling-off trajectory, or to other predefined conditions.

The device 6 moreover comprises a selector S3 for choosing between a pre-selected law D, E, F, G of standard type, and a holding-level law C. As long as the leveling-off conditions are not met, the selector S3 chooses, via a cascade of selectors S4, S5, S6, S7 which are bound respectively to said laws D, E, F, G, the command U emanating from the law which is initially engaged by an automatic handler for managing modes 15 (of standard type, which is linked to said selectors S4 to S7).

On the other hand, when the leveling-off conditions are detected by the means 14, the selector S6 selects the holding-level law C. According to the invention, this automatic toggling is carried out regardless of the law D, E, F, G initially engaged (for example, a "GLIDE/SLOPE" law, a law of vertical speed, of acquisition of altitude or of airspeed, etc.), by virtue of the cascade of selectors S4 to S7.

The holding of the helicopter He level is carried out at an adjustable safety height.

As may be seen in FIG. 3, the means 14 are linked to the selector S3 by way of a toggle B1 which makes it possible to return to the initial conditions prior to the toggling to the law C. To do this, the input R of this toggle B1 (whose input S is linked to the means 14) is linked to a detection element 16 which detects conditions (disengagement of mode, intervention of the pilot on the controls or change of preset for example) for carrying out such a return to the initial situation. Said toggle B1 is of the known R/S type which is such that, when the input S is set, the output is at 1, until the input R switches to 1.

What is claimed is:

1. A device for the automatic control of a helicopter comprising a main forward motion and a lift rotor for being controlled at least along a pitching axis, said device comprising:

at least one first objective section in respect of the pitching axis which includes a vertical objective algorithm used to automatically determine a control command for operating the tilting of the disk of said main rotor of the helicopter to bring at least one state parameter of the helicopter to an objective which represents a preset value of a state parameter;

at least one second objective section in respect of the pitching axis which includes a speed limitation algorithm used to limit the airspeed of the helicopter with respect to at least one limit value;

detection means for automatically detecting the reaching by an airspeed corresponding to said limit value; and toggling means for, in order to select one of said first and second objective sections whose control command is used for the pitching axis, automatically toggling from said first objective section to said second objective section, when said detection means detect that the airspeed has reached said limit value.

2. The device as claimed in claim 1, wherein said limit value is a maximum permitted speed.

3. The device as claimed in claim 1, wherein said limit value is a minimum permitted airspeed.

4. The device as claimed in claim 1, wherein said detection means compare the airspeed with respect to two limit values, a maximum permitted airspeed and a minimum permitted airspeed and wherein said speed limitation algorithm is for protection of the airspeed envelope.

5. The device as claimed in claim 1, wherein it moreover comprises:

at least one third objective section which corresponds to a second vertical objective algorithm in respect of the collective axis, this second vertical objective algorithm automatically determining a control command for operating the collective pitch of the blades of the main rotor of the helicopter; and selection means which automatically select said second vertical objective algorithm, so as to use the corresponding control command in respect of the collective axis, when said detection means detect that the airspeed has reached said limit value.

6. The device as claimed in claim 1, wherein it moreover comprises a holding-level algorithm, detection means for automatically detecting leveling-off conditions and selection means for automatically selecting said holding-level algorithm when said detection means detect leveling-off conditions, and doing so regardless of the one of said objective laws which is initially selected.

7. A system for the automatic control of a helicopter, said system comprising:

a set of sensors for automatically determining the effective values of state parameters of the helicopter;

means of adjustment allowing an operator of the helicopter to choose preset values of state parameters;

a set of actuators which act on control axes of the helicopter, according to control commands; and an automatic control device which automatically determines control commands for said actuators, as a function of the state parameters and of the preset values, received respectively from said sensors and from said means of adjustment, wherein said automatic control device is of the type specified under claim 1.

* * * * *